United States Patent
Christoffel et al.

(10) Patent No.: US 6,805,410 B2
(45) Date of Patent: Oct. 19, 2004

(54) FITTING FOR A VEHICLE SEAT

(75) Inventors: Thomas Christoffel, Herschweiler-Pettersheim (DE); Kadir Yasaroglu, Kaiserslautern (DE)

(73) Assignee: Keiper GmbH & Co. KG, Kaiserslautern (DE)

(*) Notice: Subject to any disclaimer, the term of this patent is extended or adjusted under 35 U.S.C. 154(b) by 0 days.

(21) Appl. No.: 10/646,566

(22) Filed: Aug. 22, 2003

(65) Prior Publication Data
US 2004/0036339 A1 Feb. 26, 2004

Related U.S. Application Data

(63) Continuation of application No. PCT/EP02/06876, filed on Jun. 21, 2002.

(30) Foreign Application Priority Data

Jul. 5, 2001 (DE) .......................... 101 32 701

(51) Int. Cl.⁷ ............................. B60N 2/30; B60N 2/36
(52) U.S. Cl. ............................. 297/378.12; 297/378.14
(58) Field of Search ................ 297/378.14, 378.12, 297/378.1

(56) References Cited

U.S. PATENT DOCUMENTS

| | | | | |
|---|---|---|---|---|
| 3,736,026 A | * | 5/1973 | Ziegler et al. | 297/378.14 |
| 4,103,967 A | | 8/1978 | Tanaka et al. | 297/378.12 X |
| 4,268,086 A | | 5/1981 | Okuyama | |
| 4,487,390 A | | 12/1984 | Miyashita | |
| 5,052,748 A | | 10/1991 | Fourrey et al. | |
| 5,248,178 A | * | 9/1993 | Brambilla | 297/378.12 X |
| 5,265,937 A | * | 11/1993 | Allen | 297/378.12 X |
| 5,383,699 A | | 1/1995 | Woziekonski et al. | 297/378.12 X |
| 5,476,307 A | * | 12/1995 | Whalen | 297/378.14 X |
| 5,676,424 A | | 10/1997 | Winkelhake | |
| 5,725,279 A | * | 3/1998 | Ward et al. | 297/378.1 |
| 5,938,286 A | | 8/1999 | Jones et al. | |
| 6,000,742 A | | 12/1999 | Schaefer et al. | 297/336 X |
| 6,209,955 B1 | * | 4/2001 | Seibold | 297/378.12 X |
| 6,540,232 B2 | * | 4/2003 | Hansel et al. | 277/378.14 X |
| 6,598,938 B2 | * | 7/2003 | Boltze et al. | 297/378.12 X |
| 6,629,710 B1 | | 10/2003 | Shafry et al. | |
| 6,659,557 B2 | * | 12/2003 | Deptolla | 297/378.12 X |

FOREIGN PATENT DOCUMENTS

| | | |
|---|---|---|
| DE | 620809 | 10/1935 |
| DE | 33 09 253 A1 | 9/1983 |
| DE | 33 40 393 A1 | 5/1984 |
| DE | 38 20 986 A1 | 1/1989 |
| DE | 38 28 659 A1 | 3/1989 |
| DE | 44 29 405 A1 | 2/1996 |
| DE | 195 23 609 A1 | 1/1997 |
| DE | 196 48 974 A1 | 5/1997 |
| DE | 198 50 751 C1 | 5/2000 |
| DE | 199 49 759 C1 | 10/2000 |
| DE | 100 34 430 A1 | 1/2002 |
| EP | 0 516 593 A1 | 12/1992 |
| EP | 1 068 985 A1 | 1/2001 |
| GB | 2 129 678 A | 5/1984 |
| WO | WO 96/20848 | 7/1996 |
| WO | WO 03/004306 A1 | 1/2003 |

OTHER PUBLICATIONS

U.S. patent application No. 10/646,567, filed Aug. 22, 2003; In re: Petry, entitled *Adjuster for a Vehicle Seat*.

* cited by examiner

Primary Examiner—Rodney B. White
(74) Attorney, Agent, or Firm—Alston & Bird LLP

(57) ABSTRACT

In a fitting for a vehicle seat, particularly an automobile seat, having two fitting parts (5, 8) which are pivotable relative to one another, thus allowing pivoting of a backrest (12) of the vehicle seat (3) between at least one sitting position and a table position and/or a reclining position, with the fitting having a pawl (15) which is pivolably borne on a first fitting part (5) and acting jointly with at least one single locking element (18, 32) of the second fitting part (8) to lock the fitting (1), the pawl (15) locks the fitting (1) in the sitting position as well as in the table and/or reclining position.

20 Claims, 2 Drawing Sheets

FITTING FOR A VEHICLE SEAT

CROSS-REFERENCE TO RELATED APPLICATION

This application is a continuation of International Application No. PCT/EP02/06876, which was filed Jun. 21, 2002, and is entirely incorporated herein by reference.

BACKGROUND OF THE INVENTION

The present invention pertains to a fitting for a vehicle seat, in particular for an automobile seat, having two fitting parts that can be pivoted relative to one another and by way of which a backrest of the vehicle seat can be pivoted between at least one sitting position and a table position and/or a reclining position, with the fitting having a pawl that is pivotably borne on a first of the fitting parts and acts jointly with at least one single locking element of a second of the second fitting parts to lock the fitting.

In a known fitting of the above-described type, there is a locking device for the sitting position, whereas the table position is locked and secured by means of a stop or another locking device. In practice, much remains to be desired, for example with respect to the number of components and therefore production costs.

BRIEF SUMMARY OF THE INVENTION

The present invention is based on the object of improving a fitting of the type mentioned above. In accordance with one aspect of the present invention, a fitting for a vehicle seat, particularly an automobile seat, has two fitting parts that can be pivoted relative to one another and by way of which a backrest of the vehicle seat can be pivoted between at least one sitting position and a table position and/or a reclining position, with the fitting having a pawl that is pivotably borne on a first of the fitting parts and acts jointly with at least one single locking element of a second of the fitting parts to lock the fitting, wherein the pawl locks the fitting in the sitting position as well as in the table or reclining position.

By virtue of the fact that the pawl locks the fitting both in the upright sitting position and in the flat table position or, if applicable, also in the reclining position, one and the same locking device can be used for the fitting. In this way the number of the components and, consequently, the production costs, are reduced. These advantages become even clearer when the pawl falls into the same locking position in the sitting position as well as in the table or reclining position, and is preferably also secured by the same safety elements and/or unlocked by the same activation element, this feature also simplifying and improving operation.

Preferably, there are a corresponding number of locking elements for the different possible positions of the backrest, such as bolts, each acting jointly with the same pawl, the latter preferably having one or several mouths depending on the arrangement and geometry of the components. The mouths then enclose at least one of the locking elements and are arranged on different sides of the pawl so as to simplify the movements of the components. The mouths can also be replaced by hooks, tongues, or similar elements. The locking elements have been conceived as single elements and not as separate parts of a long-stretched toothed element or a similar element. Preferably, the locking elements can move the pawl into its locking position, this feature reducing the number of mutual spring loads and thus simplifying production.

The fitting can be used in vehicle seats whose backrests can be pivoted into special positions; for example, into a forward inclined table position, a backward inclined or flat reclining position or a forward inclined free-swing position.

BRIEF DESCRIPTION OF THE DRAWINGS

The invention is explained in greater detail below with reference to an exemplary embodiment illustrated in the drawings, in which.

DETAILED DESCRIPTION OF THE INVENTION

Figure 1:
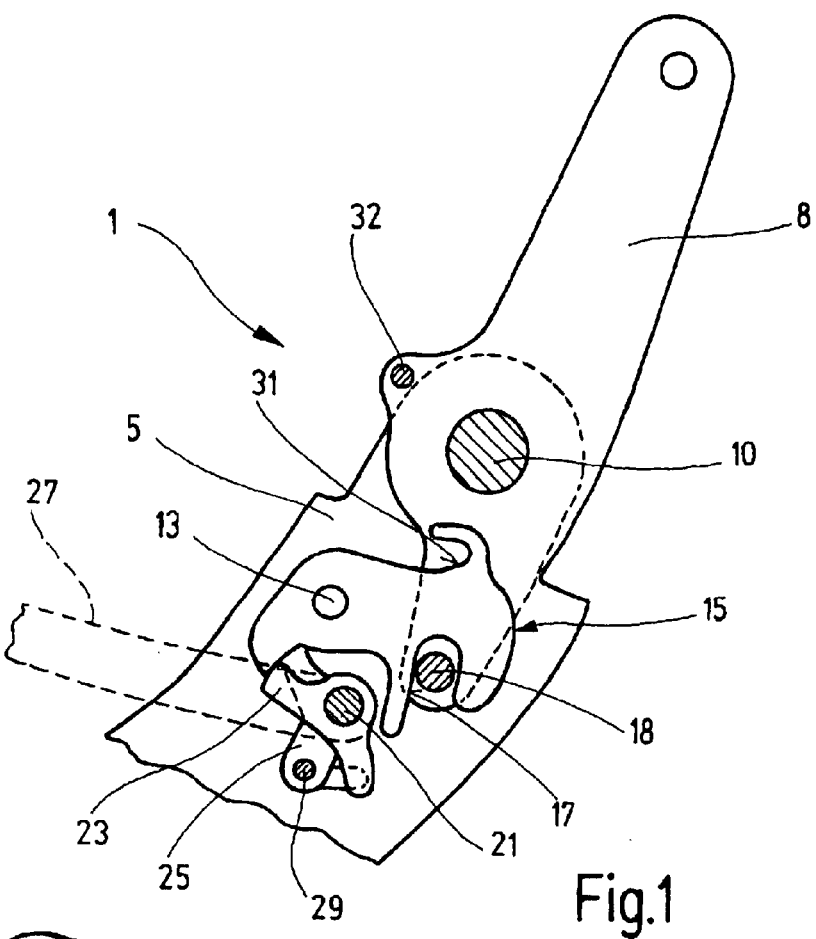
FIG. 1 is a partially sectional view of the exemplary embodiment with the backrest in the sitting position.
Figure 2:
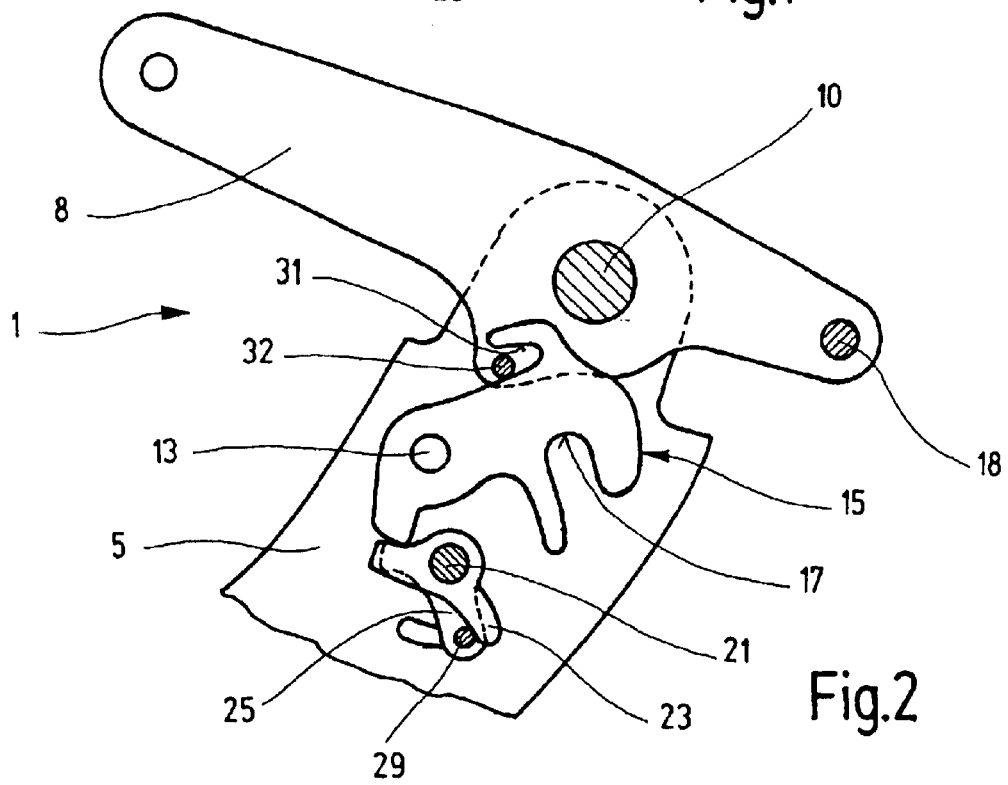
FIG. 2 is a representation analogous to FIG. 1 with the backrest in an intermediate position.

A fitting 1 for a vehicle seat 3 in a rear seat group has a seat component-fixed lower fitting part 5 and a backrest-fixed upper fitting part 8 rotatable relative to the lower fitting part 5 around a backrest bolt 10. There is a fitting 1 of this type on the seat component 11 of the vehicle seat 3 on both sides of the vehicle seat 3 in the direction of travel, both fittings 1 together bearing the backrest 12 of the vehicle seat 3. The backrest 12 can be pivoted by way of these fittings 1 between an upright driving or sitting position and a flat, at least approximately horizontal table position, and can be locked in each of these positions. The arrangement of the seat component 11 determines the following references regarding direction.

A pawl 15 is pivotably borne on a pawl bearing bolt 13 of the lower fitting part 5, which is parallel to the backrest bolt 10. In the sitting position of the backrest 12, the pawl 15, with a first hook mouth 17, seizes from above a first locking bolt 18. The first locking bolt 18 protrudes parallel to the backrest bolt 10 from an area of the upper fitting part 8 which is arranged, in the sitting position of the backrest 12, below the backrest bolt 10.

A clamping cam 23 is pivotably borne and a catching element 25 is fixedly mounted on a shaft 21 that is borne in the lower fitting part 5 below the pawl bearing bolt 13 and parallel to the backrest bolt 10. The clamping cam 23 is spring loaded and bears against the pawl 15 to secure the pawl 15 in the described locked position in the sitting position of the backrest 12. The catching element 25 is mounted at a small distance from the pawl 15 and supports the pawl 15 in the event of a crash so that it cannot open. The shaft 21 extends preferably between the two fittings 1 so that they may be synchronously activated and preferably unlocked by means of a hand lever 27 that is fixedly attached to the shaft 21 axially pointing away from the shaft. The catching element 25 which must be pivoted first when unlocking the fitting 1, bears a carry-along bolt 29 which, when unlocking the fitting, once a certain pivoting angle is exceeded, carries the clamping cam 23 along by means of a protruding area of the material, thus releasing the pawl 15.

On the side which, when the pawl 15 is opened, moves ahead, the pawl 15 has a second hook mouth 31 which opens in the sitting position towards the front of the vehicle. The upper fitting part 8 has a second locking bolt 32 in the area which in the sitting position is located in front of the backrest bolt 10 in the direction of travel.

To switch from the sitting position to the table position, the catching element 25 and the clamping cam 23 in both fittings 1 are pivoted back by means of the hand lever 27, and the pawl 15 is pivoted upward, i.e. counter-clockwise with reference to the figure. In so doing, the pawl 15 releases the first locking bolt 18.

Figure 3:
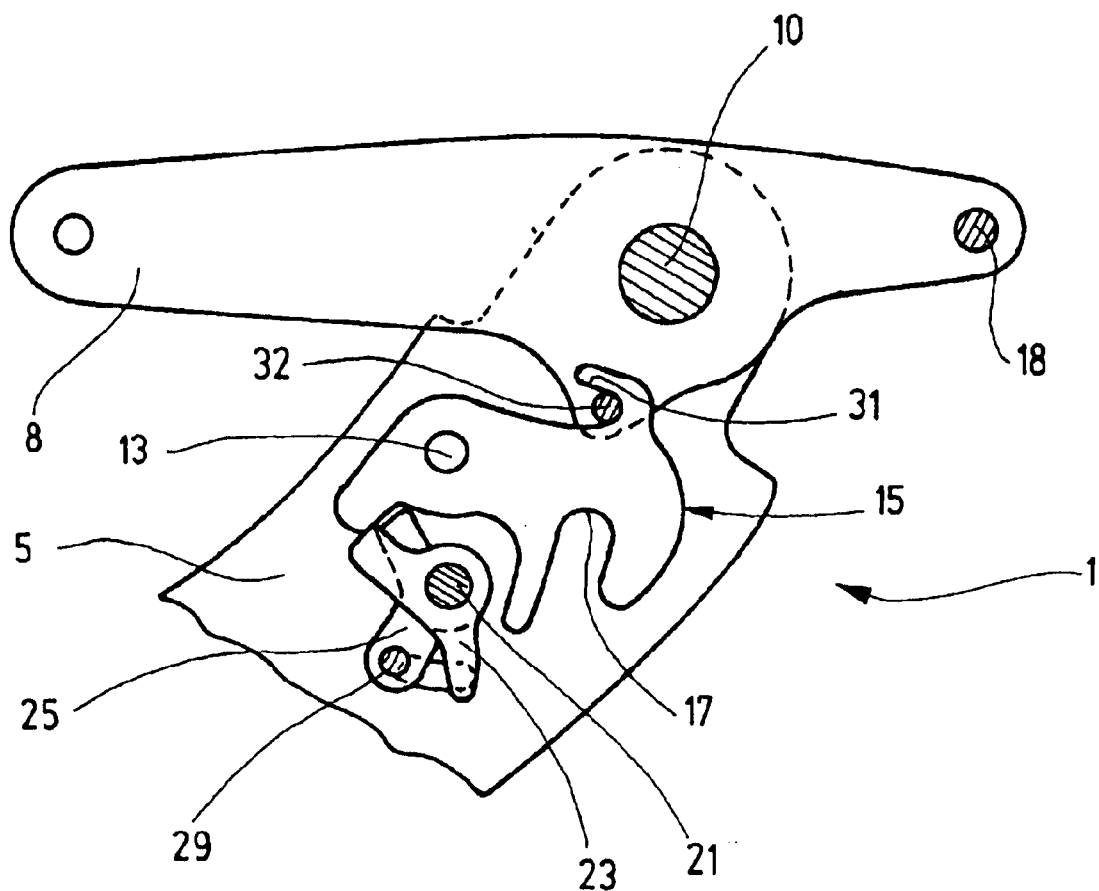
FIG. 3 is a representation analogous to FIG. 1 with the backrest in the table position.
Figure 4:
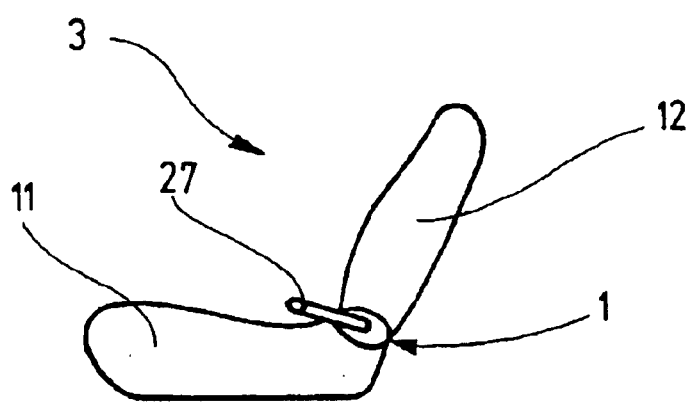
FIG. 4 is a schematic representation of a vehicle seat.

The upper fitting part 8 can now be pivoted forward, the area with the first locking bolt 18 moving away from the pawl 15, and the area with the second locking bolt 32 moving closer to the pawl 15. In an inclined intermediate position of the backrest 12, the second locking bolt 32 comes to bear against the pawl 15, presses the pawl 15 downward again during another pivoting movement of the upper fitting part 8, i.e. in the figure in a clockwise direction, and finally reaches the second mouth 31, thereby again locking the fitting 1. As shown in FIG. 3, the pawl 15 then again takes a locking position identical with the locking position shown in FIG. 1 for the sitting position, the pawl 15 thus having identical functions. The pawl 15 in turn is preferably secured by the clamping cam 23 and the catching element 25 as safety elements. The chosen geometry, i.e. the measurements and radii of the second mouth 31 and the distances to the pivoting axles, ensures that the pawl 15, in the position described, is not opened by a momentum of the safety elements.

The return to the sitting position is initiated by activating the hand lever 27, which unlocks the fittings 1 in the manner described. When pivoting the backrest 12 into an upward position, first the pawl 15, released from the safety elements 23 and 25, is opened with respect the second locking bolt 32 and is then also released from the second locking bolt 32. As soon as the first locking bolt 18 bears against a protruding edge of the first mouth 17, it presses the pawl 15 downward again, i.e. in a clockwise direction, so that the pawl, once the sitting position has been restored, once again reaches its locking position in which it can enclose the first locking bolt 18 on three sides and is secured by the safety elements 23 and 25.

That which is claimed:

1. A fitting for a vehicle seat having a seat component and a backrest, the fitting comprising:
   fitting parts mounted so that there can be relative rotation between the fitting parts, wherein the fitting parts are for allowing the backrest to pivot relative to the seat component from a first position, in which the backrest extends upright from the seat component so that a user can sit in the seat, to at least one other position selected from a reclining position and a table position, with the reclining position being achieved by pivoting the backrest away from the first position by pivoting the backrest in a first direction relative to the seat component, and the table position being achieved by pivoting the backrest away from the first position by pivoting the backrest in a second direction relative to the seat component, with the first and second directions being opposite from one another; and
   a pawl that is pivotably carried on a first fitting part of the fitting parts and releasably cooperates with:
      a first locking element of a second fitting part of the fitting parts to lock the fitting in the first position, and
      a second locking element of the second fitting part to lock the fitting in the other position,
   wherein:
      the pawl is arranged in a locking position while the pawl locks the fitting in the first position, and the pawl is also arranged in said locking position while the pawl locks the fitting in the other position,
      a first mouth of the pawl receives the first locking element to lock the fitting in the first position,
      a second mouth of the pawl receives the second locking element to lock the fitting in the other position, and
      the first and second mouths, with respect to the pivoting movement of the pawl, are respectively open in different directions.

2. A fitting according to claim 1, further comprising safety elements for securing the pawl in said locking position while the pawl locks the fitting in the first position, with the same safety elements securing the pawl in said locking position while the pawl locks the fitting in the other position.

3. A fitting according to claim 2, further comprising an activation element for unlocking the fitting from the first position, with the same activation element unlocking the fitting from the other position.

4. A fitting according to claim 2, wherein the first locking element is a bolt, and the second locking element is a bolt.

5. A fitting according to claim 2, wherein the safety elements include a clamping cam and a catching element.

6. A fitting according to claim 5, wherein the catching element:
   is positioned a small distance from the pawl prior to a crash, and
   supports the pawl in event of the crash.

7. A fitting according to claim 5, wherein the clamping cam is spring loaded and bears against the pawl to secure the pawl in said locking position.

8. A fitting according to claim 7 wherein the catching element:
   is positioned a small distance from the pawl prior to a crash, and
   supports the pawl in event of the crash.

9. A fitting according to claim 1, further comprising an activation element for unlocking the fitting from the first position, with the same activation element unlocking the fitting from the other position.

10. A fitting according to claim 9, wherein the first locking element is a bolt, and the second locking element is a bolt.

11. A fitting according to claim 1, wherein the first locking element is a first bolt, and the second locking element is a second bolt.

12. A fitting according to claim 11, wherein:
   the first bolt is positioned so that when the backrest is pivoted to the first position, the first bolt comes into contact with the pawl and moves the pawl into said locking position of the pawl so that the first mouth of the pawl is in receipt of the first bolt and thereby the fitting is locked in the first position, and
   the second bolt is positioned so that when the backrest is pivoted to the other position, the second bolt comes into contact with the pawl and moves the pawl into said locking position of the pawl so that the second mouth of the pawl is in receipt of the second bolt and thereby the fitting is locked in the other position.

13. A fitting according to claim 1, wherein:
   the first locking element is positioned so that when the backrest is pivoted to the first position, the first locking element comes into contact with the pawl and moves the pawl into said locking position of the pawl so that the first locking element and the pawl cooperate with one another and thereby lock the fitting in the first position, and
   the second locking element is positioned so that when the backrest is pivoted to the other position, the second locking element comes into contact with the pawl and moves the pawl into said locking position of the pawl so that the second locking element and the pawl cooperate with one another and thereby lock the fitting in the other position.

14. A fitting according to claim 1, wherein the fitting is in combination with the vehicle seat, the first fitting part is mounted to the seat component, and the second fitting part is mounted to the backrest, with the second fitting part being mounted for pivoting relative to the first fitting part, for allowing the backrest to pivot relative to the seat component at least between the first position and the other position.

15. A fitting for a vehicle seat having a seat component and a backrest, the fitting comprising:

fitting parts mounted so that there can be relative rotation between the fitting parts, wherein the fitting parts are for allowing the backrest to pivot relative to the seat component from a first position, in which the backrest extends upright from the seat component so that a user can sit in the seat, to at least one other position selected from a reclining position and a table position, with the reclining position being achieved by pivoting the backrest away from the first position by pivoting the backrest in a first direction relative to the seat component, and the table position being achieved by pivoting the backrest away from the first position by pivoting the backrest in a second direction relative to the seat component, with the first and second directions being opposite from one another; and a pawl that is pivotably carried on a first fitting part of the fitting parts and releasably cooperates with:
  a first locking element of a second fitting part of the fitting parts to lock the fitting in the first position, and
  a second locking element of the second fitting part to lock the fitting in the other position, wherein:
  a first mouth of the pawl receives the first locking element to lock the fitting in the first position,
  a second mouth of the pawl receives the second locking element to lock the fitting in the other position,
  the first locking element is a first bolt,
  the second locking element is a second bolt,
  the pawl is arranged in a locking position while the pawl locks the fitting in the first position, and the pawl is also arranged in said locking position while the pawl locks the fitting in the other position, and
  the fitting further comprises safety elements for securing the pawl in said locking position while the pawl locks the fitting in the first position, with the same safety elements securing the pawl in said locking position while the pawl locks the fittings in the other position, and the safety elements each being mounted for pivoting relative to the pawl.

16. A fitting according to claim 15, wherein:

the first locking element is positioned so that when the backrest is pivoted to the first position, the first locking element comes into contact with the pawl and moves the pawl into said locking position of the pawl so that the first mouth of the pawl is in receipt of the first locking element and thereby the fitting is locked in the first position, and the second locking element is positioned so that when the backrest is pivoted to the other position, the second locking element comes into contact with the pawl and moves the pawl into said locking position of the pawl so that the second mouth of the pawl is in receipt of the second locking element and thereby the fitting is locked in the other position.

17. A fitting according to claim 15, wherein the safety elements include a clamping cam and a catching element.

18. A fitting according to claim 17, wherein the catching element:
  is positioned a small distance from the pawl prior to a crash, and
  supports the pawl in event of the crash.

19. A fitting according to claim 17, wherein the clamping cam is spring loaded and bears against the pawl to secure the pawl in said locking position.

20. A fitting according to claim 15, wherein the first and second mouths, with respect to the pivoting movement of the pawl, are respectively open in different directions.

* * * * *